(12) United States Patent
Ferrieu

(10) Patent No.: US 6,233,380 B1
(45) Date of Patent: May 15, 2001

(54) ELECTROOPTIC METHOD OF SIGNAL PROCESSING, DEVICE FOR IMPLEMENTING THE LATTER, AND USE

(75) Inventor: Frédéric Ferrieu, Corenc (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/289,667

(22) Filed: Apr. 12, 1999

(30) Foreign Application Priority Data

Apr. 10, 1998 (FR) .................................................. 98 04557

(51) Int. Cl.[7] ...................................................... G02B 6/26
(52) U.S. Cl. ............................ 385/30; 385/14; 385/129; 385/130; 385/131; 385/31
(58) Field of Search ................................ 385/1, 2, 3, 14, 385/15, 5, 27, 28, 31, 129, 130, 131, 141, 30

(56) References Cited

U.S. PATENT DOCUMENTS

| | | | |
|---|---|---|---|
| 3,753,157 | * | 8/1973 | Ash et al. ............................ 385/28 X |
| 4,705,346 | * | 11/1987 | Miyawaki ............................ 385/14 X |
| 4,763,972 | * | 8/1988 | Papuchon et al. .................. 385/14 X |
| 4,932,743 | * | 6/1990 | Isobe et al. ........................ 385/14 X |
| 5,208,800 | * | 5/1993 | Isobe et al. ........................ 385/14 X |
| 5,321,498 | * | 6/1994 | Song et al. ............................ 385/14 |
| 5,625,729 | | 4/1997 | Brown ................................... 385/31 |
| 5,652,816 | | 7/1997 | Minami et al. ........................ 385/31 |

OTHER PUBLICATIONS

S. Chouteau et al., "Optaelectronic Microswitch on SOI Based Structure", 1995 IEEE International SOI Conference Proceedings, Tucson, Oct. 3–5, 1995, pp. 40/41 XP000590645.

* cited by examiner

Primary Examiner—Brian Healy
(74) Attorney, Agent, or Firm—Foley & Lardner

(57) ABSTRACT

The present invention relates to an electrooptic method of signal processing, characterized in that it comprises the steps consisting in: providing at least one semiconductor component consisting at least of a substrate (10) and of a superposed assembly comprising at least one guiding layer (14) and applying, to the guiding layer (14), optical radiation at a wavelength and at an angle of incidence chosen in such a way that said assembly has, at this wavelength and at this angle of incidence, a specific absorption peak suitable for allowing said optical radiation to be guided in the guiding layer (14) The invention also relates to a device for implementing this method, as well as the use of the latter.

34 Claims, 2 Drawing Sheets

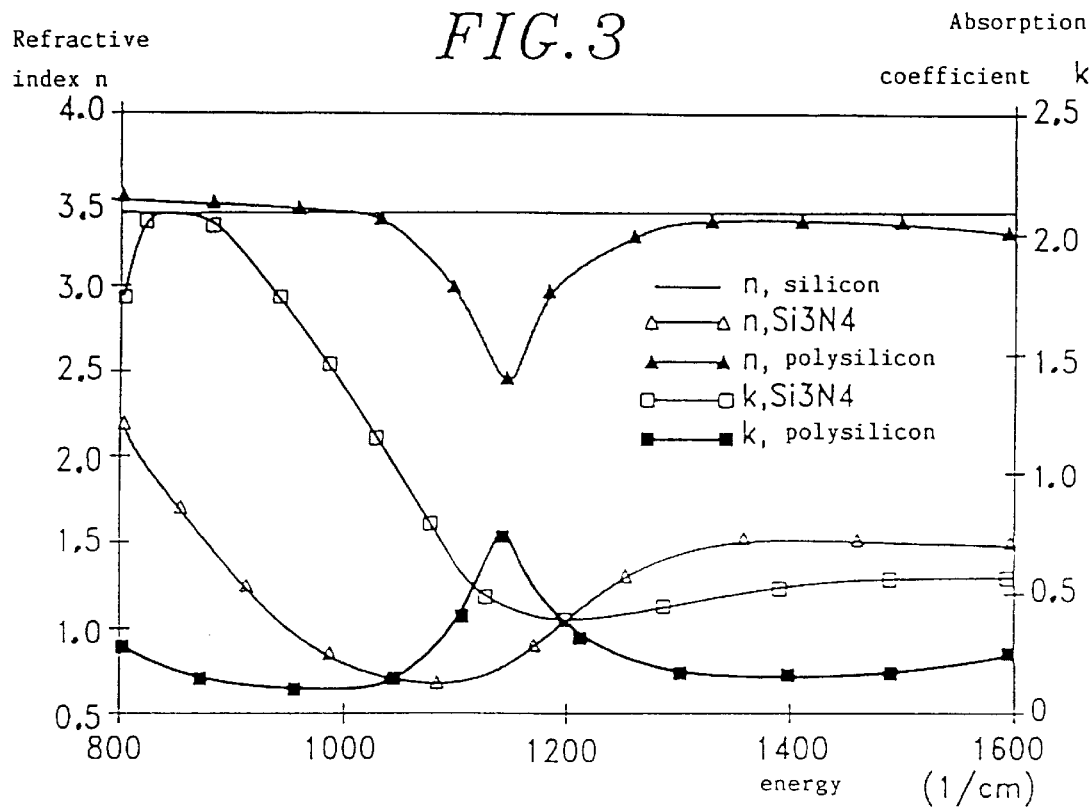
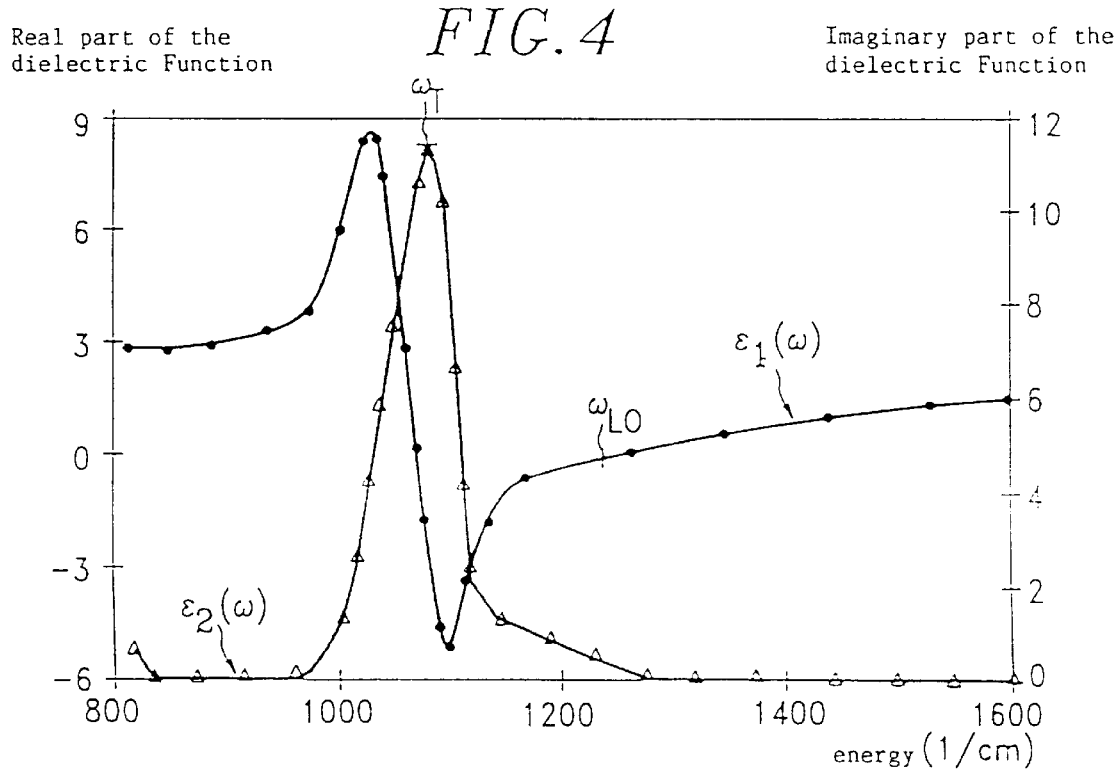

ELECTROOPTIC METHOD OF SIGNAL PROCESSING, DEVICE FOR IMPLEMENTING THE LATTER, AND USE

BACKGROUND OF THE INVENTION

The present invention relates to the field of optoelectronics.

Many systems presently being studied in laboratories or being commercially exploited combine semi-conductor electronic components with components which provide the function of guiding an optical beam, emitted by the electronic components for example, or which are applied to these for control or treatment purposes.

The field of optoelectronics has thus already given rise to a very extensive literature.

However, to the knowledge of the Applicant, this field has not experienced significant development in recent years.

SUMMARY OF THE INVENTION

The object of the present invention, based on the result of experiments, is to propose novel means having improved performance over the known prior systems.

A main object of the present invention is specially to propose means which make it possible to optimize the coupling of an optical beam to a semiconductor structure, without requiring the use of semiconductor compositions or of a technology which are difficult to employ.

This object is achieved within the context of the present invention by virtue of an electrooptic method of signal processing, comprising the steps consisting in:

providing at least one semiconductor component including a substrate and a superposed assembly comprising at least one guiding layer, and applying, to the guiding layer, optical radiation at a wavelength and at an angle of incidence chosen in such a way that said assembly has, at this wavelength and at this angle of incidence, a specific absorption peak suitable for allowing said optical radiation to be guided in the guiding layer.

According to another advantageous characteristic of the present invention, the wavelength and the angle of incidence are chosen in order to generate resonant optical interference associated with an evanescent wave formed at at least one interface of the guiding layer.

According to another advantageous characteristic of the invention, said assembly superposed on the substrate comprises the guiding layer and at least one layer which is interposed between the substrate and this guiding layer and which has a refractive index of less than that of the guiding layer, at the wavelength of the applied optical radiation.

As will be understood on reading the detailed description which follows, the present invention makes it possible, in particular, to make very rapid interconnections between electronic components while ensuring perfect electrical isolation between them.

The present invention also relates to a device for implementing this method.

BRIEF DESCRIPTION OF THE DRAWINGS

Other features, objects and advantages of the present invention will appear on reading the detailed description which follows and with regard to the appended drawings, given by way of non-limiting examples and in which:

FIGS. 2 and 3 illustrate diagrammatically experimental curves forming the basis of the invention and FIG. 4 shows the real part (curve through the circles) and the imaginary part (curve through the triangles) of the dielectric function ($\varepsilon = n^2$) of an $SiO_2$ layer used, for example, as a layer subjacent to the guiding layer.

DETAILED DESCRIPTION OF THE INVENTION

Figure 1:
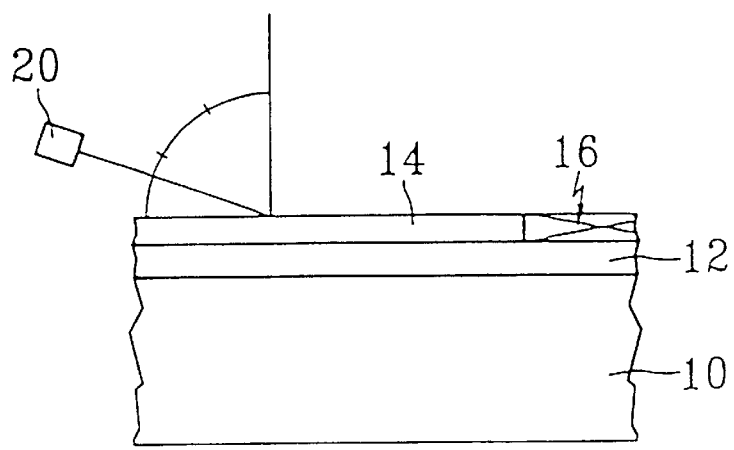
FIG. 1 shows diagrammatically a structure of a device according to the present invention.

Shown in the appended FIG. 1 is an optoelectronic device comprising a substrate 10 made of semiconductor material, for example based on silicon, and successively superposed on the latter are a first layer 12 made of a semi-insulating material, for example silicon oxide $SiO_2$, and a second layer 14 forming a guiding layer, for example made of polysilicon. FIG. 1 also illustrates, in the extension of the second layer 14, with the reference 5 16, an electronic component capable of being associated with the guiding layer 14, for example in the form of an MOS (Metal Oxide Semiconductor) transistor formed in the extension of the guiding layer 14.

FIG. 1 also illustrates, with the reference 20, a radiation source capable of applying, to the guiding layer 14, light radiation of a wavelength and at an angle of incidence A which are chosen so that the guiding layer 14 has, at this wavelength and at this angle of incidence A, an absorption peak suitable for allowing the light radiation to be guided in the guiding layer 14.

More specifically still, the inventor has determined that, in the case of a structure in conventional MOS technology, comprising a guiding layer 14 made of polysilicon, deposited for example by CVD on a subjacent layer 12 made of silicon oxide, the radiation applied by the radiation source 20 to the guiding layer 14 preferably has a wavelength of about 8 $\mu$m at an angle of incidence A of between 70 and 76°.

The invention has in fact determined that, under these conditions, the radiation is guided in the polysilicon layer 14. At this angle of incidence, the wave enters the guiding layer at an angle of approximately 16°, which is the critical angle for propagation in guided mode in the polysilicon. On the other hand, outside this parameter range, the light is not guided.

By way of non-limiting example, a quantum cascade laser, of the type described in the document Applied Physics Letters, vol. 72, No. 12, March 1998, C. Gmachl et al., "Continuous-wave and high-power pulsed operation of index-coupled distributed feedback quantum cascade laser at $\lambda \approx 8.5 \,\mu\text{m}$", incorporated herein by reference, may be used as radiation source 20.

Even more specifically, the polysilicon layer 14 forming the guiding layer preferably has a thickness of about 200 to 400 nm, while the subjacent oxide layer 12 has a thickness of at least 10 nm.

The present invention thus allows effective guiding of a monochromatic infrared wave in a polysilicon film obtained using a conventional technology.

As will be specified below, the present invention may be used in many applications.

For example, it makes it possible to ensure simultaneous optical control of several transistors, for example of the MOS type, which are electrically isolated from each other and with respect to the guide wave, by virtue of such a polysilicon film.

It also makes it possible to ensure that one transistor is optically switched by another, without there being any electrical contact between them: in this case, the switched transistor receives an optical control signal coming from the switching transistor via the aforementioned guiding layer. This application makes it possible, for example, to use two transistors operating at different voltages or else located in different circuit units.

Thus, for example on a standard MOS structure, i.e. with a gate made of $SiO_2$ (having a thickness of greater than 1 nm and which may or may not be nitrided) and a gate material made of amorphous, polycrystalline or single-crystal silicon) which may or may not be stacked with Ge, it is possible to modify the state of the transistor by light at suitable wavelengths incident on the surface at a given angle.

The transmitted light, in addition to modifying the state of the transistor, may also be guided in the layer of gate material and act on another transistor (or several other transistors) without there being any electrical contact between the transistors (something which is impossible to achieve in the conventional architectures of known devices).

Moreover, the inventor has determined that the guiding effect exploited in the context of the present invention is due to resonant optical interference associated with the evanescent wave which exists at the two interfaces of the polysilicon layer.

This resonant evanescent wave propagates longitudinally in the polysilicon layer.

This results from the fact that, by respecting the aforementioned angle-of-incidence and wavelength parameters, the guiding layer 14 is sandwiched between two flanking layers (the layer 12 and the air, or another layer similar to the layer 12) having refractive indices of less than that of the guiding layer 14.

The present invention thus makes it possible to obtain the conditions suitable for confining the light in the guiding layer 14, without requiring thick guiding layers.

Consequently, the present invention makes it possible, in particular, for there to be perfect compatibility between the planar technology of an MOS transistor and the technology of producing the guiding layer 149 The present invention makes it possible, in particular, to eliminate the differences in level existing in certain systems proposed in the prior art between the guiding layers and the semiconductor structures.

Of course, the present invention-is not limited to the particular embodiments which have just been described, but extends to all variants in accordance with its spirit.

The present invention may be applied to semiconductor structures, in particular to polysilicon-based semiconductor structures, whatever the crystalline state of the latter, namely amorphous, microcrystalline or single-crystal (the silicon-on-insulator case).

The present invention may also be applied to germanium-based structures.

The technology of the layer 12 subjacent to the guiding layer 14 may form the subject of many alternative embodiments. This may involve, for example, an oxide layer obtained by oxidation in the dry phase (under $O_2$) or wet phase ($O_2+H_2$) or else by CVD deposition, whether or not assisted by plasma or UV.

This may also involve a subjacent layer 12 based on nitride ($Si_3N_4$). However, in this case the wavelength adopted is preferably about 9 $\mu$m.

The present invention may, for example, also find application in photonic materials or filters.

By way of non-limiting example, within the context of a filter, a transistor may be used which will be switched or not switched depending on he angle of incidence upon an associated guiding layer and on the associated wavelength.

Likewise, the present invention may find application in systems designed to switch a transistor only after a combination of two or more wavelengths, which allows an optical control logic (the combination of wavelengths which are incident on the structure) with an electrical effect (modification of the electrical state of the gate, and therefore of the transistor, with or without guiding, in order to act on another transistor).

The present invention may also find application in the fabrication of photonic crystals by a plasma etching of resonant structures which depend on the wavelength of the light propagated and on the spacing of the grating.

Illustrated in the appended FIG. 1 is a structure in which the guiding layer 14 receives the radiation directly on its surface. As a variant, it is conceivable for the radiation to be incident on the end of this guiding layer 14, or else through a window made in a superposed confinement layer, for example a layer similar to the subjacent layer 12.

Figure 2:
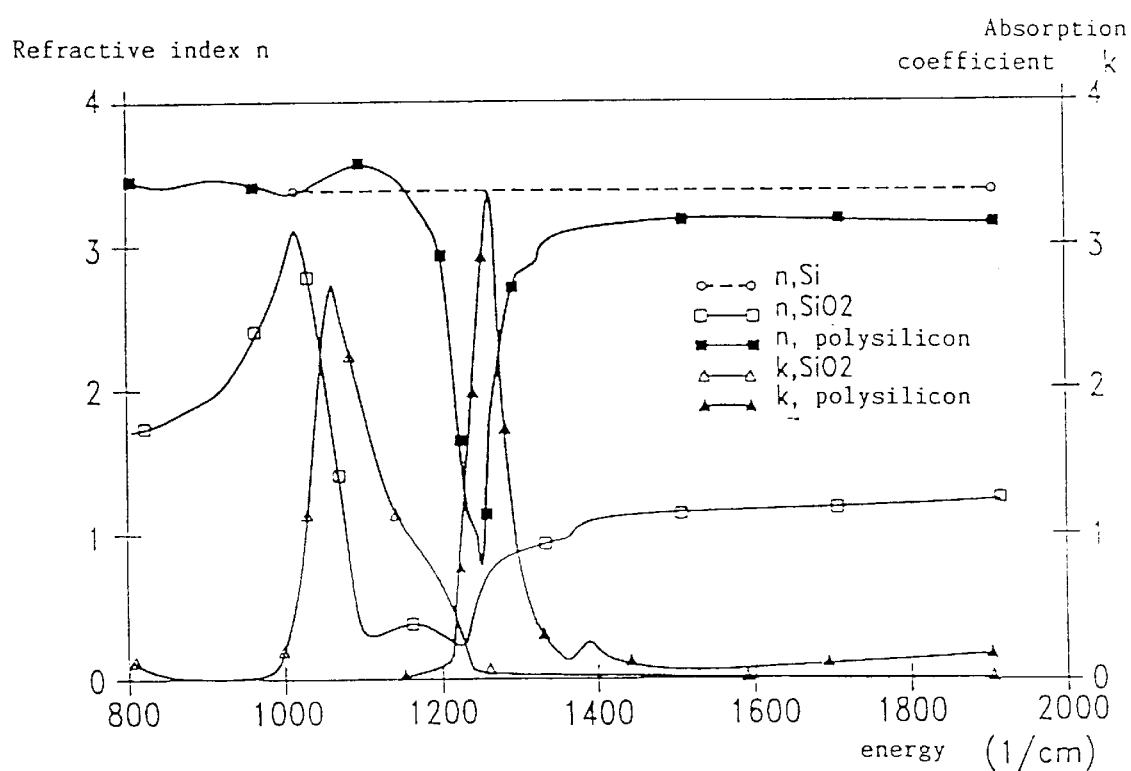

Illustrated in the appended FIG. 2, which is at the basis of the present invention, is the variation in the refractive index n and of the absorption coefficient k as a function of the energy ($cm^{-1}$) of the applied radiation, these being measured on a structure comprising a 200 nm polysilicon guiding layer 14 deposited on an $SiO_2$ layer. More specifically, FIG. 2 illustrates:

by a broken line, the refractive index n of silicon, by a line through the open squares, the refractive index n of $SiO_2$, by a line through the solid squares, the refractive index n of polysilicon, by a line through the open triangles, the absorption coefficient of $SiO_2$, by a line through the solid triangles, the absorption coefficient of polysilicon.

FIG. 2 shows an absorption peak in the polysilicon guiding layer 14 for E of about 1260 $cm^{-1}$.

FIG. 3 shows similar curves for a structure in which the $SiO_2$ layer is replaced by a layer of nitride $Si_3N_4$ deposited on a silicon substrate.

More specifically, FIG. 3 illustrates:

by a continuous line, the refractive index n of silicon, by a line through the open triangles, the refractive index n of $Si_3N_4$, by a line through the solid triangles, the refractive index n of polysilicon, by a line through the open squares, the absorption coefficient of $Si_3N_4$, and by a line through the solid squares, the absorption coefficient of polysilicon.

FIG. 3 shows an absorption peak in the polysilicon guiding layer 14 for E of about 1130 $cm^{-1}$.

Moreover, the inventor has determined that it is desirable to satisfy the following conditions:

1) the guiding layer (14) has a high index n, typically of about 3 to 4, and a zero absorption coefficient, k=0, and 2) the wavenumber $\omega$ of the optical radiation expressed in $cm^{-1}$ is between the transverse wavenumber $\omega_T$ and the longitudinal wavenumber $\omega_{LO}$ of the layer 12 subjacent to the guiding layer 14, i.e.: $\in_1(\omega)<0$ and $\omega_T<\omega<\omega_{LO}$, in which relationships:

$\omega_T$ corresponds to the maximum value of $\in_2$, $\in_2$ representing the imaginary part of the dielectric function, and $\omega_{LO}$ corresponds to the zero value of $\in_1$, $\in_1$ representing the real part of the dielectric function.

By satisfying this condition, one lies within the so-called "reststrahlen" band.

The $\omega_T$ and $\omega_{LO}$ values are identified in FIG. 4.

Definitions of $\omega_T$ and $\omega_{LO}$ will be found in the documents "Optical Properties of Thin Films and the Berreman Effect", B. Harbecke et al., Appl. Phys. A38 263–267 (1985), incorporated herein by reference, and "Infrared Absorption Bands at Polar Longitudinal Optic Mode Frequencies in Cubic Crystal Films", D. W. Berreman, Phys. Rev. 130, 2193–2198 (1963) incorporated herein by reference.

Within the context of the present invention, it may also be envisaged to place electrodes on a region of the guiding layer 14 made of doped polysilicon in order to create a photomodulation effect associated with the presence of free carriers present in the doped-polysilicon layer. An electrical modulation induces an index modulation due to the effect of the free carriers. Furthermore, this effect is all the more pronounced, the closer the wavelength range is to the associated plasmon frequency.

Moreover, delimiting regions with a high doping level, which are positioned on the guiding part 14, makes it possible to create a resonant cavity which can be easily associated with a cascade-type SiGe laser tuned to this wavelength.

What is claimed is:

1. An electrooptic method of controlling a semi-conductor component comprising the steps of:
   providing at least one semiconductor component including a substrate and a superposed assembly, said superposed assembly comprising at least one guiding layer; and
   applying, to said at least one guiding layer, optical radiation at a wavelength and at an angle of incidence chosen such that said superposed assembly has, at the wavelength and at the angle of incidence, a specific absorption peak suitable for allowing said optical radiation to be guided in said at least one guiding layer; and
   wherein the wavelength and the angle of incidence of said optical radiation are chosen in order to generate resonant optical interference associated with an evanescent wave formed at at least one interface of said at least one guiding layer.

2. Method according to claim 1, wherein said superposed assembly further comprises at least one additional layer interposed between said substrate and said at least one guiding layer, said at least one additional layer having a refractive index of less than that of said at least one guiding layer at the wavelength of said optical radiation.

3. Method according to claim 1, wherein said at least one guiding layer has a high refractive index n between about 3 to 4 and a zero absorption coefficient k=0.

4. Method according to claim 1, wherein said superposed assembly further comprises at least one subjacent layer interposed between said substrate and said at least one guiding layer, and wherein a wavelength $\omega$ of said optical radiation expressed in cm$^{-1}$ is between a transverse frequency $\omega_T$ of said at least one subjacent layer and a longitudinal frequency $\omega_{LO}$ of said at least one subjacent layer such that $\epsilon_1(\omega)<0$ and $\omega_T<\omega<\omega_{LO}$.

5. Method according to claim 1, wherein said superposed assembly further comprises at least one subjacent layer made of silicon oxide and interposed between said substrate and said at least one guiding layer, said at least one guiding layer is made of polysilicon, deposited on said at least one subjacent layer, and said optical radiation applied to said at least one guiding layer has a wavelength of about 8 µm at an angle of incidence (A) of between 70 and 76°.

6. Method according to one of claim 1, wherein said superposed assembly further comprises at least one subjacent layer made of silicon nitride and interposed between said substrate and said at least one guiding layer, said at least one guiding layer is made of polysilicon, deposited on said at least one subjacent layer, and said optical radiation applied to said at least one guiding layer has a wavelength of about 9 µm at an angle of incidence (A) of between 70 and 76°.

7. Method according to claim 1, wherein said superposed assembly further comprises at least one subjacent layer interposed between said substrate and said at least one guiding layer, and said at least one guiding layer has a thickness of about 200 to 400 nm, while said at least one subjacent layer has a thickness of at least 10 nm.

8. Method according to claim 1, said optical radiation is in an infrared range.

9. An optoelectronic device comprising:
   at least one semiconductor component including a substrate and a superposed assembly, said superposed assembly comprising at least one guiding layer, and
   a radiation source capable of applying, to said at least one guiding layer optical radiation at a wavelength and at an angle of incidence chosen such that said superposed assembly has, at the wavelength and at the angle of incidence, a specific absorption peak suitable for allowing said optical radiation to be guided in said at least one guiding layer;
   wherein the wavelength and the angle of incidence are chosen in order to generate resonant optical interference associated with an evanescent wave formed at at least one interface of said at least one guiding layer.

10. An optoelectronic device according to claim 9, wherein said superposed assembly further comprises at least one additional layer that is interposed between said substrate and said at least one guiding layer and that has a refractive index of less than that of said at least one guiding layer, at said wavelength of said optical radiation.

11. An optoelectronic device according to claim 9, wherein said at least one guiding layer has a high index n, of about 3 to 4, and a zero absorption coefficient, k=0.

12. An optoelectronic device according to claim 9, wherein said superposed assembly further comprises at least one subjacent layer interposed between said substrate and said at least one guiding layer, and the wavelength $\omega$ of said optical radiation expressed in cm$^{-1}$ is between a transverse frequency $\omega_T$ of said at least one subjacent layer and a longitudinal frequency $\omega_{LO}$ of said at least one subjacent layer such that $\epsilon_1(\omega)<0$ and $\omega_T<\omega<\omega_{LO}$.

13. An optoelectronic device according to claim 9, wherein said superposed assembly further comprises at least one subjacent layer made of silicon oxide and interposed between said substrate and said at least one guiding layer, said at least one guiding layer is made of polysilicon, and said optical radiation applied to said at least one guiding layer has a wavelength of about 8 µm at an angle of incidence (A) of between 70 and 76°.

14. An optoelectronic device according to claim 9, wherein said superposed assembly further comprises at least one subjacent layer made of silicon nitride and interposed between said substrate and said at least one guiding layer, said at least one guiding layer is made of polysilicon, and said optical radiation applied to said at least one guiding layer has a wavelength of about 9 µm at an angle of incidence (A) of between 70 and 76°.

15. An optoelectronic device according to claim 9, wherein said superposed assembly further comprises at least one subjacent layer interposed between said substrate and said at least one guiding layer, and said at least one guiding layer has a thickness of about 200 to 400 nm, while said at least one subjacent layer has a thickness of at least 10 mn.

16. An optoelectronic device according to claim 9, wherein said superposed assembly is based on polysilicon.

17. An optoelectronic device according to claim 9, wherein said superposed assembly is based on germanium.

18. An optoelectronic device according to claim 9, wherein said superposed assembly comprises an oxide layer under said at least one guiding layer.

19. An optoelectronic device according to claim 9, wherein said superposed assembly comprises a nitride-based layer under said at least one guiding layer.

20. An optoelectronic device according to claim 9, wherein said at least one guiding layer receives said optical radiation on an end of said at least one guiding layer.

21. An optoelectronic device according to claim 9, wherein said optical radiation is in an infrared range.

22. An optoelectronic device according to claim 9, further comprising electrodes deposited on a region of said at least one guiding layer in order to create a photomodulation effect associated with the presence of free carriers present in said at least one guiding layer.

23. An optoelectronic device according to claim 9, further comprising at least one region with a high doping level on said at least one guiding layer, forming a resonant cavity.

24. An optoelectronic device according to claim 23, wherein said resonant cavity is associated with a cascade-type laser tuned to its wavelength.

25. An optoelectronic device according to claim 9, wherein said optoelectronic device is configured for simultaneous optical control of several electronic components.

26. An optoelectronic device according to claim 9, wherein said optoelectronic device is configured for optically switching one electronic component by another electronic component, without any electrical contact between said one electronic component and said another electronic component.

27. An optoelectronic device according to claim 9, wherein said optoelectronic device is configured for producing a filter, in the form of a transistor that is switched depending on the angle of incidence upon an associated guiding layer and on the associated wavelength.

28. An optoelectronic device according to claim 9, wherein said optoelectronic device is configured for switching an electronic component after a combination of several wavelengths.

29. An optoelectronic device according to claim 9, wherein said optoelectronic device is configured for fabrication of photonic crystals by plasma etching of resonant structures which depend on the wavelength of the light propagated and on the spacing of the grating.

30. An optoelectronic device according to claim 9, wherein said superposed assembly further comprises a confinement layer superposed on said substrate, and said at least one guiding layer receives said optical radiation through a window made in said confinement layer.

31. An optoelectronic device according to claim 9, wherein said superposed assembly further comprises a confinement layer superposed on said at least one guiding layer, and said at least one guiding layer receives said optical radiation through a window made in said confinement layer.

32. An optoelectronic device according to claim 25, wherein said electronic components include transistors electrically isolated from each other.

33. An optoelectronic device according to claim 26, wherein said one electronic component is a transistor.

34. An optoelectronic device according to claim 28, wherein said electronic component is a transistor.

* * * * *